May 28, 1929.   T. P. CHASE ET AL   1,714,900
AUTOMATIC BRAKE ADJUSTMENT
Filed Nov. 28, 1927   2 Sheets-Sheet 1

Inventor
Theron P. Chase &
William S. Lee
By Blackmore, Spencer & Huff
Attorneys

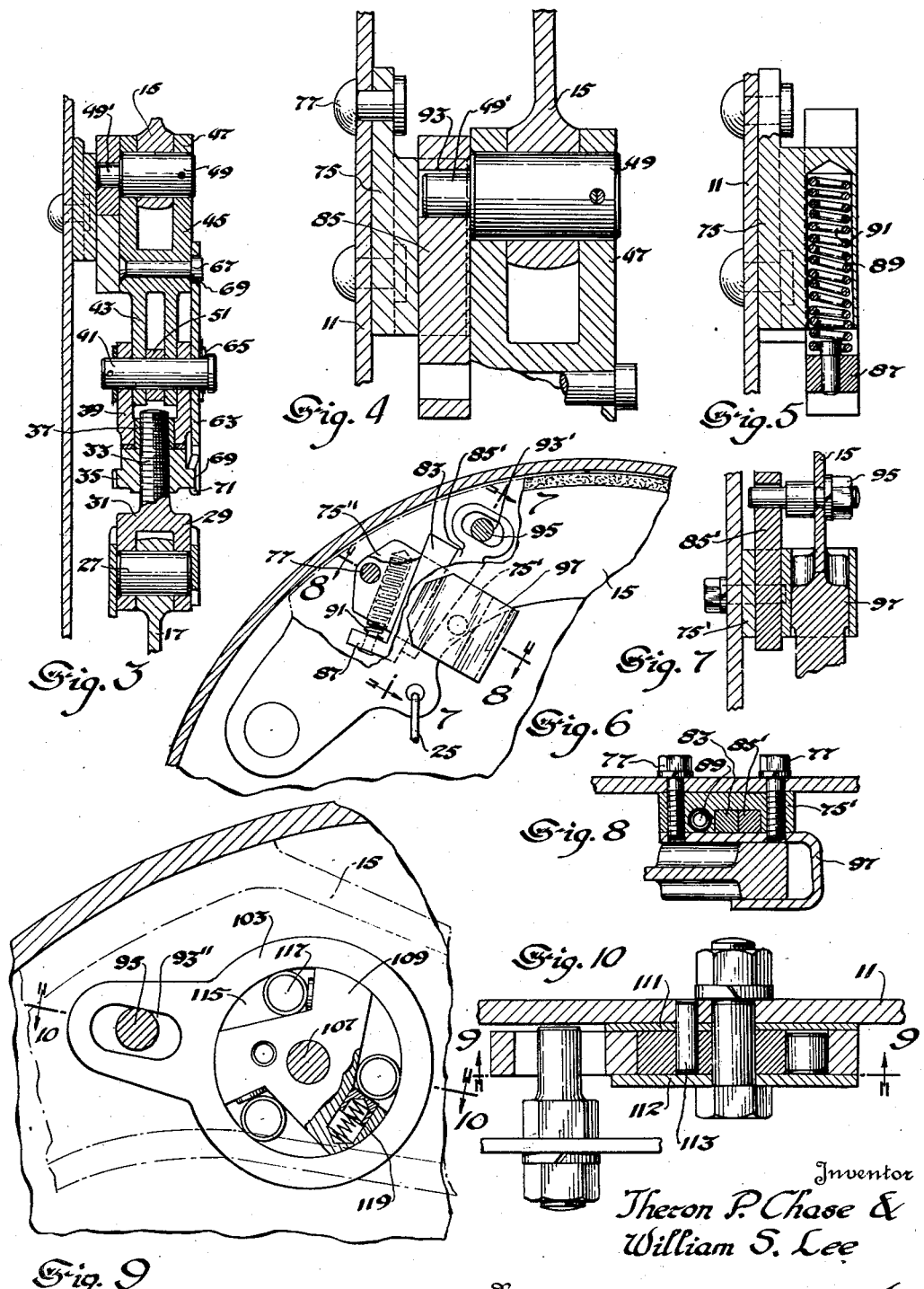

Patented May 28, 1929.  1,714,900

UNITED STATES PATENT OFFICE.

THERON P. CHASE AND WILLIAM S. LEE, OF DETROIT, MICHIGAN, ASSIGNORS TO GENERAL MOTORS RESEARCH CORPORATION, OF DETROIT, MICHIGAN, A CORPORATION OF DELAWARE.

AUTOMATIC BRAKE ADJUSTMENT.

Application filed November 28, 1927. Serial No. 236,225.

This invention relates to brakes and more particularly to internal brakes for use on vehicles. The novel device constituting the subject of this invention is useful with either a band or a shoe type of brake.

It is an object of the invention to provide a stop to limit the movement of the brake shoe or band away from the drum. As a further object the invention provides a self adjusting stop of the kind described wherein the stop automatically adjusts itself to provide for decreasing thicknesses of the lining used with the band or shoe. A further object is to provide a stop comprising movable parts, but of simple construction and one which may be conveniently applied to the brake. Other objects and advantages will be apparent from a reading of the accompanying specification.

Referring to the drawing accompanying this description, wherein are illustrated several embodiments of the invention, Figure 1 is a view in side elevation of the brake shoes and actuating mechanism.

Figure 3 is a section substantially on the line 3—3 of Figure 1.

Figure 4 is a section on line 4—4 of Figure 2.

Figure 5 is a section on line 5—5 of Figure 2.

Figure 6 is a view in elevation of a modified form of automatic stop.

Figure 7 is a section on line 7—7 of Figure 6.

Figure 8 is a section on line 8—8 of Figure 6.

Figure 9 is a view in elevation of a third form of automatic brake adjustment.

Figure 10 is a section on line 10—10 of Figure 9.

Figure 1:
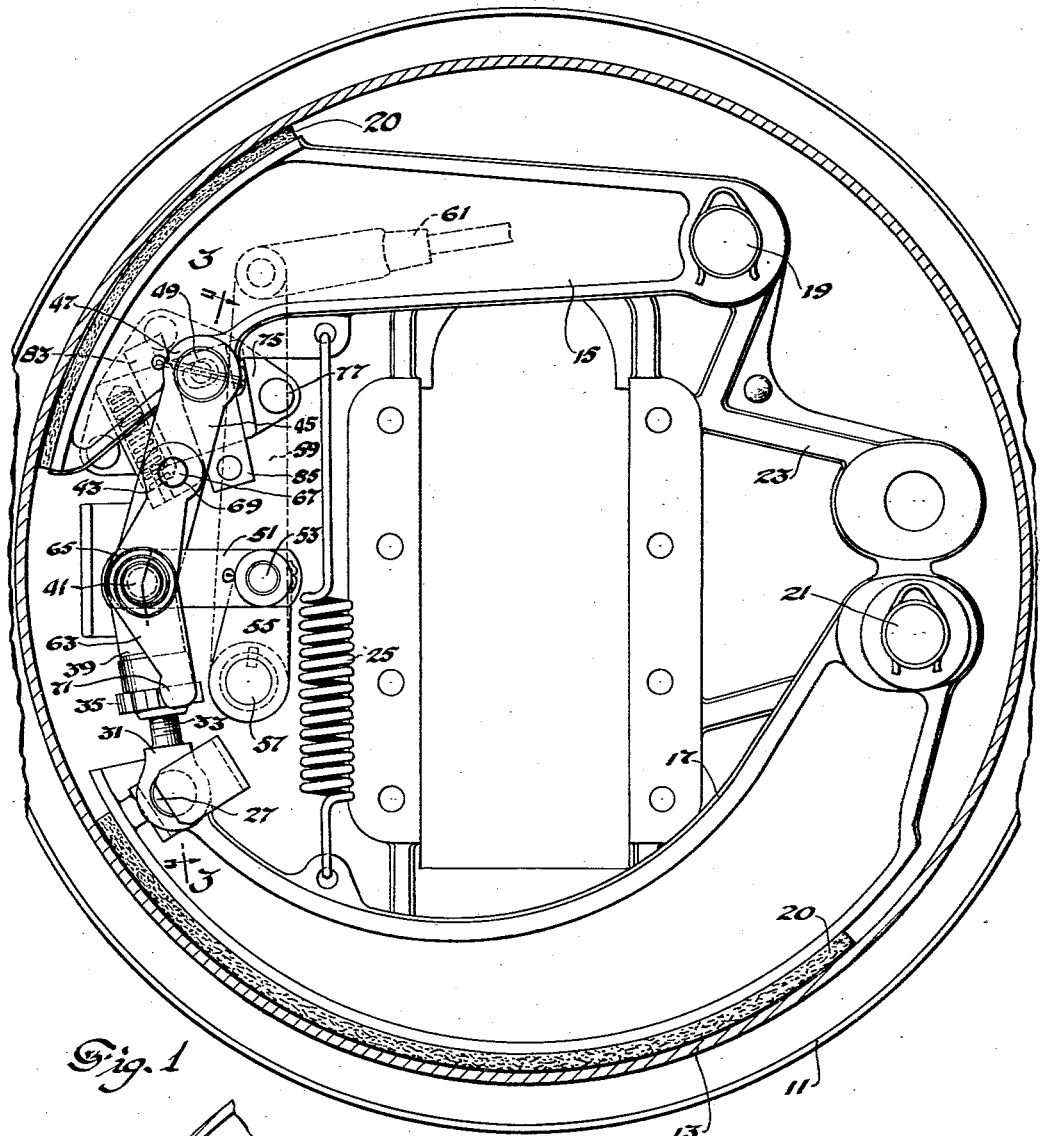
Figure 2:
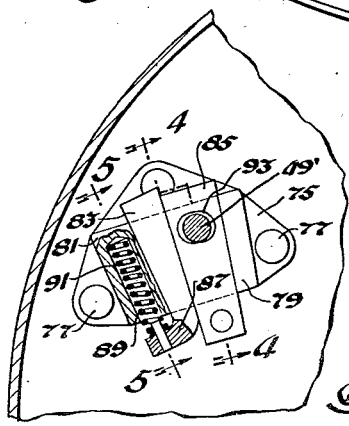
Figure 2 is a view in elevation, partly in section, of the automatic stop device, the brake shoe being removed to better illustrate the structure of the stop.

Referring by reference characters to the drawing, numeral 11 represents a backing plate or dust guard, which, in the case of the rear wheel, is to be rigidly secured to the axle housing. In the case of the front wheel this plate is to be secured to the knuckle rotatably carrying the steering wheel and swivelled for rotation on the end of the axle for steering purposes. This location, the attachment of the backing plate in its relation to the axle and wheels, is conventional, is not illustrated and need not be further described. Numeral 13 illustrates the brake drum which is to be secured in any usual or preferred manner to the wheel, the drum and the backing plate constituting, as usual, a closed space protecting the brake shoe or band from dirt and moisture.

The invention as illustrated is associated with two shoes 15 and 17 pivoted to the backing plate 11, at 19 and 21 respectively. These shoes are provided with lining 20, which may be of any desired kind. All such linings become reduced in thickness as the result of repeated brake application. It is preferred that the backing plate be reenforced by suitable strengthening means such as is shown by numeral 23, this strengthening means being of any preferred form and constituting no part of this invention. It will also be observed that shoe 15 is illustrated as having a lesser peripheral dimension than shoe 17. This is being so illustrated since it may be preferred to utilize a shoe having a greater circumferential engaging portion for the self actuating shoe for forward driving. However, the difference in shoe dimensions may or may not be adopted as desired. This invention is not concerned with the specific form of brake means used to frictionally engage the drum and may be used with substantially any internal brake. A suitable spring, such as a coil spring 25, is connected at its ends to each of the two shoes to draw the shoes away from the drum after the braking action is relieved.

For expanding the shoes into engagement with the drum and checking or stopping the rotating movement of the drum and of the wheel to which it is secured, any desired means may be employed. I prefer to use for this purpose the means illustrated. This means may be briefly described herein. Upon the end of shoe 17 remote from its pivot anchor is a pin 27 which pivotally carries the forked end 29 of a link 31. This link is formed with a threaded spindle 33 and engaged within a threaded nut 35. The nut 35 is received within the open end of a link 39, the other end of which is forked where it is pivoted upon a pin 41. Also pivoted on pin 41 are the forks 43 of a link member 45 having at its other end forks 47 pivoted by a pin 49 carried on the end of shoe 15. Within forks 43 and rotatable on the pin 41 is the end of a link 51. Link 51 is pivoted at 53 to an arm 55 on the rock shaft 57, the rock shaft being preferably journalled in the backing plate. Outside the backing plate the rock shaft may be provided with a long arm 59 to the end of which is pivotally connected a link 61. This link 61 is to be connected in any suitable manner with the brake pedal or lever, not shown. From an inspection of Figure 1 it will be seen that a movement of link 61 to the right operates through rock shaft 57, arm 55 and link 51 and the toggle constituted by the links joining pin 41 to the adjacent ends of the shoes to straighten out the toggle and expand the shoes into engagement with the drum. Pivoted on the pin 41 is a lever 63. A spring 65 may be used to hold this lever against part 39, the spring engaging the lever and the head of the pin 41. Intermediately located on link 43 is a pin 67 projecting into an enlarged opening 69 of lever 63. At its other end the lever 63 has a pawl 71 positioned to engage ratchet teeth on the outer peripheral surface of nut 35. By this means, when the brake is applied a movement of pin 67 in the opening 69 first occurs, lever 63 moving with link 39. As pin 67 reaches the end of opening 69 the lever 63 is held for movement with link 45 and its pawl may be advanced to the next tooth on the threaded nut 35 with the result that upon release movement of the brake the nut is rotated to increase the distance between the shoe ends in the brake released position. As a result of this arrangement a powerful toggle is made available for brake operation and an automatic slack adjustment is associated therewith to secure automatically a desired brake clearance. As the linings become worn the automatic adjustment expands the brake shoes to maintain a desired clearance between the shoe and the drum.

Such a slack adjusting means operates to automatically separate the adjacent ends of the shoe or band to compensate for wear of the lining as explained above. There is usually employed with internal brakes a stop or stops carried by the fixed plate or backing plate to engage the inner side wall of the shoe or band, the side remote from the drum, when the brake is released under the action of the releasing spring. The releasing spring pulls the band or shoes against the stop. The stops are positioned so that a predetermined clearance is secured between the drum and band when the brake is released. If this clearance is correct for a band or shoe having a lining of a given thickness it will be seen that the position will become incorrect when the lining becomes reduced in thickness due to wear. In coming to rest on the incorrectly positioned stop, one shoe or band part may be spaced unnecessarily far from the drum and the other brake shoe or band half may drag on the drum. In the event that the brake is applied by the actuating means having the automatic slack adjustment above described, the shoes, taken together, may in released position sufficiently approach the drum dimensions to give the desired clearance. If the stop, however, is too far inward in a radial line one shoe, when it rests on the stop may permit the other to drag on the drum. It therefore becomes desirable if not necessary to adjust the stop in accordance with the reduced thickness of the brake lining. It has been proposed to do so by manually operable adjusting means, such, for example, as eccentrics. The present invention aims to accomplish this result by means strictly automatic and requiring no attention.

The automatic stop for the purpose stated may take several forms. In Figures 1 to 5 inclusive a first form is shown. Secured to the backing plate beneath the operated end of shoe 15 is shown what may be called a stop housing 75. The plurality of fastening means 77, three being shown, are used for securing the stop housing to the backing plate. The face of the housing 75 remote from the backing plate and adjacent the brake shoe is recessed, the side walls of the recess 79 and 81 diverging outwardly toward the drum preferably as above shown in Figures 1 and 2. Two cooperating wedge shaped members 83 and 85 slide in the recess of the stop housing. These members 83 and 85 have their adjacent parallel faces slidably engaging each other and their opposed inclined faces slidable on the diverging walls of the housing recess as shown. Wedge members 83, which may be called the locking wedge, has at its inner end an angular extension 87, directed away from the wedge member 85 and lying inwardly of the housing 75. Housing 75 is bored out at 89 and a coil spring 91 is placed in the opening. The end of the spring engages the angular end 87 of wedge member 83. Wedge member 85, which may be called the adjusting wedge, has an enlarged opening 93 located to receive a reduced end 49' of pin 49 (see Figures 3 and 4) when the housing 75 is secured to the backing plate and the shoe assembled. Normally when the brake is in released position the pin 49' engages the inner wall of opening 93. The dimension of the opening 93 is such that, as the shoe is rotated about its pivot 19 the pin 49 moves freely within said opening 93. If the brake lining becomes worn and reduced in thickness and greater pedal movement is required to expand the shoe into contact with the drum pin 49' engages the outer wall of opening 93 and pulls the adjusting wedge member 85 outwardly. In so moving the locking wedge member is relieved from the pressure of the adjusting wedge member 85, and under the action of spring 91 moves inwardly and prevents any return movement of the adjusting wedge member 85. When now the brake is released the releasing spring 25 withdraws the shoes and pin 49' engages the inner side of the opening 93, which, as has been explained, is removed outwardly in a radial direction from its former position. The spring 25 cannot draw the adjusting wedge 85 inwardly owing to the angular relation of the walls of the housing and the wedge members as before described. By this means new positions of the stop, the stop being the inner part of opening 93, are automatically had for varying degrees of brake lining wear. By means of the automatic stop above described the upper shoe member, when the lining is worn, cannot drop to a stop position so low as to permit the lower shoe member to drag on the drum.

In Figures 6, 7 and 8 is a similar but slightly modified form of the invention. In this form the shoe is designated by numeral 15, the end of the spring appearing in Figure 6 as 25. The automatic stop is shown as comprising a housing member 75', of generally rectangular shape, one end being angular as at 75''. Fastening means 77 secure the stop housing to the backing plate as before. The locking wedge member 83 with its extension 87 and the spring 91 are substantially the same as in the form previously described. Adjusting wedge member 85' is like wedge member 85 with the exception that it is extended and formed with a slot 93' receiving a pin 95, this pin being carried by the shoe as shown and not being an extension of pivot pin 49. The dimensions of slot 93' will be somewhat greater than the diameter of the pin 95. A cover member 97, substantially of U-shape best shown in Figure 8, may be provided with legs of unequal length, the longer leg secured by the fastening means for the wedge housing and its shorter leg overlying the shoe, as shown in Figures 6 to 8. The operation of the automatic stop device of these figures is the same as that described in connection with Figures 1 to 5.

Figures 9 and 10 illustrate another form of automatic stop. In this third form the shoe 15 carries a pin 95 engaging a slot 93'' in an arm of a rotatably mounted wedge member 103. Wedge member 103 rotates about a central clutch member 109 secured by bolt 107 together with spacing plate 111 and cover 112 to the backing plate. The clutch member 109 is kept from rotation by a pin 113. Cam slots 115 are formed in the clutch member 109, three of these slots being shown and rollers 117, spring pressed by springs 119 in recesses of the clutch member, tend to resist by yieldingly permitting clockwise movement of the adjusting member 103 about its center 107. As in the previous forms of the invention the opening 93'' will be seen to be somewhat larger than the diameter of the pin 95 so that for normal movements of brake application pin 95 travels to and fro in the opening 93''. Rotation in a counter-clockwise direction is positively prevented by the movement of the rollers toward the tapered ends of the cam slots, as will be obvious. In this form when the shoe linings become worn adjustment member 103 may rotate to a limited extent in a clockwise direction to secure a new position on the brake shoe when the brake is released.

We claim:

1. In a brake, braking means, an automatic stop therefor, said stop including slidably engaged parts, one part serving as an adjustable stop and positively movable by the brake means to positions of adjustment, the other part simultaneously and oppositely movable to lock said first part in said positions of adjustment.

2. In a brake, braking means, an automatic stop therefor, said stop including slidably engaged parts, one part serving as an adjustable stop and positively movable by the brake means to positions of adjustment, the other part movable simultaneously and oppositely to lock the first part in its positions of adjustment, and yielding means to effect said movement of said second part.

3. In a brake, braking means, an automatic stop device to determine brake released position of said braking means, said stop device comprising a wedge housing, a pair of slidable wedges in said housing, one wedge engaged at times by said braking means when the brake is being applied to be positively moved, the other wedge oppositely movable to lock said first wedge in its several positions of adjustment.

4. The invention defined by claim 3 together with yielding means to effect said movement of the locking wedge.

5. The invention defined by claim 3, said wedges having parallel slidably engaging faces and remote divergent faces, the wedge housing having diverging faces engaged by the remote faces of the wedges whereby said wedges are prevented from simultaneous movement together in one direction.

6. In a brake, braking means, an automatic stop device to determine the release position of said brake means, said stop device comprising slidably engaged members, each having remote inclined faces, a housing having divergent faces to prevent the simultaneous movement of said members together in one direction, yielding means tending to move one of said members in the direction in which said simultaneous movement is prevented, the other member having an opening with one dimension commensurate with the clearance desired for the braking means.

In testimony whereof we affix our signatures.

THERON P. CHASE.
WILLIAM S. LEE.